United States Patent
Dellisanti et al.

(10) Patent No.: US 9,923,768 B2
(45) Date of Patent: Mar. 20, 2018

(54) REPLICATING CONFIGURATION BETWEEN MULTIPLE GEOGRAPHICALLY DISTRIBUTED SERVERS USING THE REST LAYER, REQUIRING MINIMAL CHANGES TO EXISTING SERVICE ARCHITECTURE

(71) Applicant: International Business Machines Corporation, Armonk, NY (US)

(72) Inventors: Brian D. Dellisanti, North Royalton, OH (US); Matthew J. Wagner, Lakewood, OH (US); Maciej B. Zawadzki, Cleveland, OH (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 14/685,796

(22) Filed: Apr. 14, 2015

(65) Prior Publication Data

US 2016/0308721 A1    Oct. 20, 2016

(51) Int. Cl.
*G06F 15/16* (2006.01)
*H04L 12/24* (2006.01)
*H04L 29/08* (2006.01)
*H04L 29/06* (2006.01)

(52) U.S. Cl.
CPC ........ *H04L 41/0846* (2013.01); *H04L 41/082* (2013.01); *H04L 67/02* (2013.01); *H04L 67/1095* (2013.01); *H04L 67/325* (2013.01); *H04L 69/28* (2013.01)

(58) Field of Classification Search
CPC ... H04L 67/1095; H04L 67/02; H04L 67/325; H04L 69/28; H04L 41/08–41/0846
USPC ................................................. 709/220–221
See application file for complete search history.

(56) References Cited

U.S. PATENT DOCUMENTS

| | | | | |
|---|---|---|---|---|
| 6,163,855 A | * | 12/2000 | Shrivastava | ........ G06F 11/1443 709/208 |
| 7,577,661 B2 | * | 8/2009 | Bankston | .......... G06F 17/30575 |
| 8,150,800 B2 | | 4/2012 | Webman et al. | |

(Continued)

OTHER PUBLICATIONS

Junqueira, F.P. et al., "Zab: High-performance broadcast for primary-backup systems" IEEE (Jun. 27-30, 2011) pp. 245-256.

(Continued)

*Primary Examiner* — David Lazaro
(74) *Attorney, Agent, or Firm* — Scully, Scott, Murphy & Presser, P.C.; William H. Hartwell, Esq.

(57) ABSTRACT

Replicating configuration among distributed servers. A filter running on a server, the server being one of the distributed servers, intercepts a request from a client device to the server. The filter creates a unique identifier for the request and blocks the request from being processed at the server. A replicator running on the server sends the request with the unique identifier for synchronizing the request with one or more other requests received from one or more of the distributed servers. The replicator also receives an ordered list of one or more synchronized requests each annotated with a respective unique identifier. The server processes the ordered list of one or more synchronized requests having the respective unique identifier. The ordered list may include the request that is being blocked, wherein the blocked request is processed at the server responsive to receiving request as part of the ordered list.

20 Claims, 5 Drawing Sheets

(56) References Cited

U.S. PATENT DOCUMENTS

| | | | | |
|---|---|---|---|---|
| 8,495,018 B2* | 7/2013 | Chavda | ............ | G06F 17/30017 |
| | | | | 707/634 |
| 8,726,020 B2 | 5/2014 | Warman et al. | | |
| 8,762,505 B2 | 6/2014 | Kutan et al. | | |
| 8,868,701 B1 | 10/2014 | Peters et al. | | |
| 2004/0025079 A1* | 2/2004 | Srinivasan | .......... | H04L 67/1095 |
| | | | | 714/13 |
| 2004/0249918 A1* | 12/2004 | Sunshine | ............ | H04L 41/0846 |
| | | | | 709/223 |
| 2008/0104215 A1* | 5/2008 | Excoffier | ............ | H04L 67/1095 |
| | | | | 709/223 |
| 2011/0238792 A1* | 9/2011 | Phillips | ................. | G06F 15/177 |
| | | | | 709/220 |
| 2011/0307444 A1* | 12/2011 | Cox | ................. | G06F 17/30578 |
| | | | | 707/625 |
| 2015/0193515 A1* | 7/2015 | Thyagarajan | ..... | G06F 17/30575 |
| | | | | 707/610 |
| 2016/0065670 A1* | 3/2016 | Kimmel | ............ | G06F 17/30215 |
| | | | | 709/219 |

OTHER PUBLICATIONS

Ciavattone, L. et al., "Standardized Active Measurements on a Tier 1 IP Backbone" IEEE (Jun. 2003) pp. 90-97.

"The Quality of Internet Service: AT&T's Global IP Network Performance Measurements" AT&T (2003) 7 pages.

"Fusion Middleware Administrator's Guide for Oracle Access Management: 7 Using Multi-Data Centers" http://docs.oracle.com/cd/E40329_01/admin.1112/e27239/mdc.htm, 35 pages.

* cited by examiner

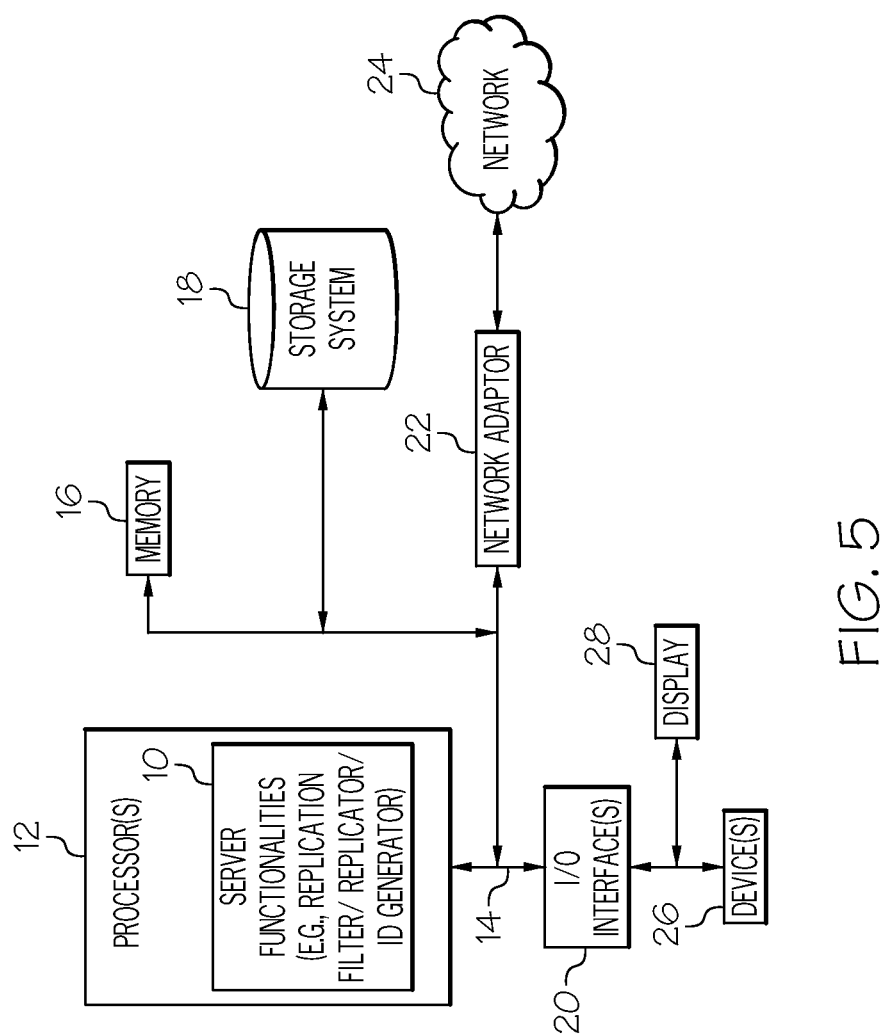

REPLICATING CONFIGURATION BETWEEN MULTIPLE GEOGRAPHICALLY DISTRIBUTED SERVERS USING THE REST LAYER, REQUIRING MINIMAL CHANGES TO EXISTING SERVICE ARCHITECTURE

FIELD

The present application relates generally to computers and computer applications, and more particularly to replicating configuration between distributed servers.

BACKGROUND

An organization may have an information technology (IT) or another compute system that may have a service installed at multiple geographic sites. All information from the service should be made available to users at each site, but due to network latency, it is not practical for all users to access the service in a single location. Hence, users in each location access a local instance of the service. As each instance of the service must be able to provide the same information, the configurations of all instances of the service at the multiple geographic sites need to be synchronized between every instance.

Various existing solutions handle this type of problem at the persistence level, relying on a low-level data storage mechanism to replicate any configuration changes once the application has made them. However, implementing such an approach in an existing service would require comprehensive changes to any functionality which modifies configuration. For example, each individual Representational State Transfer (REST) call in a service would need to be updated so that it submits changes made to specific objects into a synchronization system.

BRIEF SUMMARY

A method and system of replicating a configuration update among distributed servers may be provided. The method, in one aspect, may comprise intercepting a request from a client device to a server. The method may also comprise creating a unique identifier for the request. The method may also comprise blocking the request from being processed at the server. The method may also comprise sending the request with the unique identifier for synchronizing the request with one or more other requests received from one or more of the distributed servers. The method may also comprise receiving an ordered list of one or more synchronized requests each annotated with a respective unique identifier. The method may also comprise processing the ordered list of one or more synchronized requests having the respective unique identifier, the ordered list comprising at least the request that is being blocked, wherein the blocked request is processed at the server responsive to receiving the ordered list of one or more synchronized requests.

A system for replicating a configuration update among distributed servers, in one aspect, may comprise a server, a filter running on the server, the server being one of the distributed servers, the filter operable to intercept a request from a client device to the server, the filter further operable to create a unique identifier for the request, the filter operable to block the request from being processed at the server. A replicator running on the server may be operable to send the request with the unique identifier for synchronizing the request with one or more other requests received from one or more of the distributed servers, the replicator further operable to receive an ordered list of one or more synchronized requests each annotated with a respective unique identifier. The server may be operable to process the ordered list of one or more synchronized requests having the respective unique identifier, the ordered list comprising at least the request that is being blocked, wherein the blocked request is processed at the server responsive to receiving the ordered list of one or more synchronized requests.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 illustrates a schematic of an example computer or processing system that may implement a replication system in one embodiment of the present disclosure.

DETAILED DESCRIPTION

Figure 1:
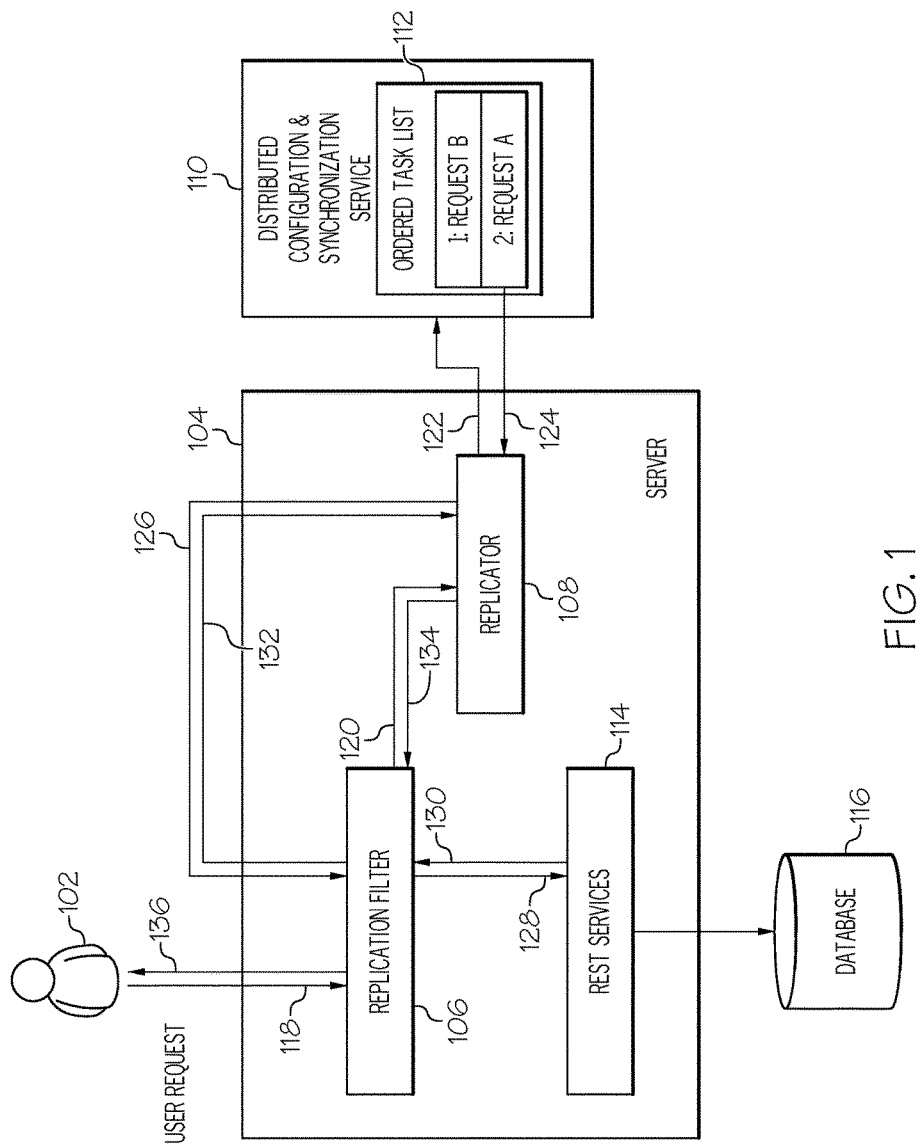
FIG. 1 illustrates handling of a replicated request on a requesting user's local server in one embodiment of the present disclosure.

In one aspect, techniques are presented that replicate configuration changes across all instances of the service, for example, while allowing services to read existing configuration quickly based on local data.

A filter is provided in one embodiment of the present disclosure, which may be applied on top of each instance of a service. The filter intercepts all requests which may cause configuration changes and, before applying any changes locally, sends the change to every other instance of the service using a distributed synchronization system. Each instance of the service may then process the requests gathered by this synchronization system in a predetermined order, so that when all changes have been fully replicated, each instance is in a consistent state because it has done the same actions as every other instance.

The filtering technique of the present disclosure in one embodiment provides a layer above the service so that fewer changes are required of the service itself to achieve replication of configuration. In one aspect, a developer only needs to apply the filter on an existing service, for all configuration changes to be applied to all instances of the service. In one aspect, this technique introduces less change to the existing code for the service and centralizes all of the logic for handling replication into a single layer rather than spreading it across all places in the service which make configuration changes.

The cost of applying the technique to replication of configuration data is reasonable for the value it provides.

Configuration data is high value because it typically requires tedious, error prone, manual entry by subject matter experts and usually divergent copies require human intervention to merge. The cost of the technique as an example is estimated to be up to 500 ms per request in a globally distributed cluster. Such cost is acceptable for data that is changed infrequently, as is the case with configuration.

The techniques in the present disclosure may be considered to be different from sharding. Sharding divides data among servers such that each server owns a subset of the data and is responsible for modifying it. In the present techniques of the present disclosure in one aspect, all servers have a local copy of the data and any server can modify any portion of the data at any time.

Likewise, the techniques in the present disclosure may be considered to be different from ClearCase style replication. ClearCase replicas can be different from each other because replication is asynchronous and conflicting changes may not be merged identically in all replicas. Further, to minimize conflicts, most objects have a single write master. In the present disclosure, in one embodiment, replicas are identical (subject to a small time delay), replicate synchronously, and permit multiple write masters for most objects.

In one aspect, a technique of the present disclosure includes asynchronously replicating the state of a server by capturing and replaying a request received by a server. Such a request, for example, may be of type or protocol that includes a predictable type or other metadata sufficient to indicate that it is an operation which will cause configuration change. An example of such a request includes hypertext transfer protocol (HTTP) REST application programming interface (API) calls against server clones. In one embodiment of the present disclosure, by executing identical calls against each server in the same order, the same final state is reached by each server. In the following description, an HTTP request is used as an example request, but it should be understood that the method, system and techniques of the present disclosure apply to other types of requests or protocols.

An incoming HTTP request is intercepted by a filter. The filter inspects the request for the method and path to determine whether the HTTP request should be replicated. Methods that are idempotent, such as GET and HEAD, are treated as not modifying server state and are executed directly. Methods that are not idempotent, such as PUT, POST, and DELETE, are treated as potentially mutating server state and are candidates for replication. Those candidates are further narrowed by a whitelist of replicatable paths. This is the final set of types of requests which will be replicated.

The content of replicated requests is packaged and delivered to the server's local replicator component. The replicator appends the packaged request to a list kept by a node or functionality that provides a distributed configuration and synchronization service for distributed systems (e.g., functionality similar to a Zookeeper™ cluster), also referred to as a distribution synchronization system, and then waits. Zookeeper™ is from Apache Software Foundation. At a point in time, the distribution synchronization system asynchronously notifies the replicator that request list has been modified. For example, when the replicator on the local server submits the request to the distribution synchronization system, the distribution synchronization system instance waits for a consensus to be reached as to the order in which the request will be handled on all instances of the server. Responsive to the consensus being reached, the distribution synchronization system instance notifies the replicator which originated the request and the request is processed. The replicator queries all new requests and executes them in order by issuing HTTP calls into its server. The replicator detects that one of the requests is the request it originally added. The response to that request is packaged and delivered to the waiting thread, which then resumes. The response is replayed as the response to the initial user request.

The distribution synchronization system or node in a system of the present disclosure functions to provide a total order of all requests received from all server instances. Each member of the distribution synchronization system cluster (a distribution synchronization system instance, a server in a cluster of the "distributed configuration and synchronization service for distributed systems") employs a consensus algorithm that allows each member to arrive at a list of the same requests in the same order. This is the sequence of requests each replicator executes against its own server.

As an example, the time overhead of replication is estimated to be 500 ms or less per request. This is based on network statistics indicating average round-trip delay between Tokyo and London is 242 ms (http://ipnetwork.b-gtmo.ip.attnet/pws/global_network_avgs.html) and experiments that show consensus in the distributed configuration and synchronization service node requires two network round-trips. Further, the system has some tolerance for extended network delays as only a simple majority of servers need to respond to establish consensus.

Some requests may result in conflicting actions if executed in certain orders. For example, a request A modifies a property of an object O. A second request B deletes object O. Executing A followed by B is not a problem, but executing B followed by A results in failure for A as the object it references no longer exists. In one embodiment, the system does not attempt to resolve this. Instead, the key property it preserves is that all servers are in the same state after executing the requests. In this example, object O is removed from all servers and request A has failed for all servers. Thus, all servers are identical.

One or more requests may create new objects in the system. In one aspect, these objects are assigned randomly generated globally unique identifiers (GUID) and by design, no two servers generate the same identifier (ID). This poses a problem because subsequent requests will refer to these objects by ID, but the correct ID may be different in each server. To resolve this problem, an embodiment of a technique of the present disclosure assigns an ID seed to each request when it is first received and this seed is used to generate a repeatable sequence of IDs that can be assigned to any new objects created by the request. The seed is attached to the request as a custom HTTP header in one embodiment.

One or more of the following mechanisms may be implemented for generating IDs. In the first mechanism, the seed forms a prefix of each ID and a counter forms the suffix. The counter is unique to each request and is initialized to zero. The final ID has a fixed size of 128 bits, 6 of which are fixed by the format of randomly generated GUIDs. The prefix is sized so that the probably of collision is not significantly reduced while permitting sufficient bits to generate enough new IDs for any request.

The second mechanism treats the seed as a cryptographic key. The key is used to encrypt a counter. The counter is initialized to zero and the initialization vector is a hard-coded constant. The encrypted output forms the ID. The probability of collisions among the IDs generated according to this mechanism is also very low.

When the replicator executes HTTP requests on its own server, it reproduces the identity of the originating user without providing credentials and includes a seed for ID generation. The ability to forge these requests may pose a serious threat to the security of the system. To prevent this type of threats, in one embodiment, an additional header is added to the request that contains a secret unique ID to the server. Before acting on any request from the replicator, the secret is first verified. Requests with an invalid or missing secret are ignored.

FIG. 1 illustrates handling of a replicated request on a requesting user's local server in one embodiment of the present disclosure. A user 102 submits a request to a local server 104, for example, as shown by an arrow at 118. A replication filter 106 intercepts the request, determines that it is not idempotent, and sends request data to the replicator 108 as shown by an arrow at 120. The replication filter 106 blocks the request until the replicator 108 receives a response. The replicator 108 submits the request to a synchronization service node 110 as shown by an arrow at 122, which adds the work to the ordered list 112 for all server instances.

Once the request is first in line for the local synchronization service node instance, all servers receive the request through a watcher in the replicator 108 as shown by an arrow at 124. For examples, the servers communicate with the distribution synchronization system which may comprise a plurality of nodes. In one aspect, it is not necessary to have one-to-one correlation between the number of the distribution synchronization system nodes and the number of servers, but there may be a cluster of both the distribution synchronization system nodes and servers in a physical location. Responsive to receiving the request through a watcher, the replicator 108 makes a request to its own server 104 as shown by an arrow at 126. This request is received by the replication filter 106 as shown by an arrow at 126. A special parameter on the request instructs the replication filter 106 to let this request pass through. A header attached to the request may be implemented for this purpose, e.g., that includes a flag that marks or indicates that the request comes from the replicator. Responsive to validating a secret key, this flag may be looked for. If the key is valid and the flag is found, the request is processed. The request gets to the REST service 114 as shown by an arrow at 128 to perform the appropriate action (create or modify an object). The changed configuration, e.g., created or modified object may be stored in a database 116. The result of the REST call is returned from the REST service 114 up through the replication filter 106 as shown by an arrow at 130. The response is received by the local replicator 108 as shown by an arrow at 132. Responsive to receiving the response for the original request, the replicator 108 returns from the original call from the replication filter 106 as shown by an arrow at 134. The response is passed back to the user 102 who made the request as shown by an arrow at 136.

Figure 2:
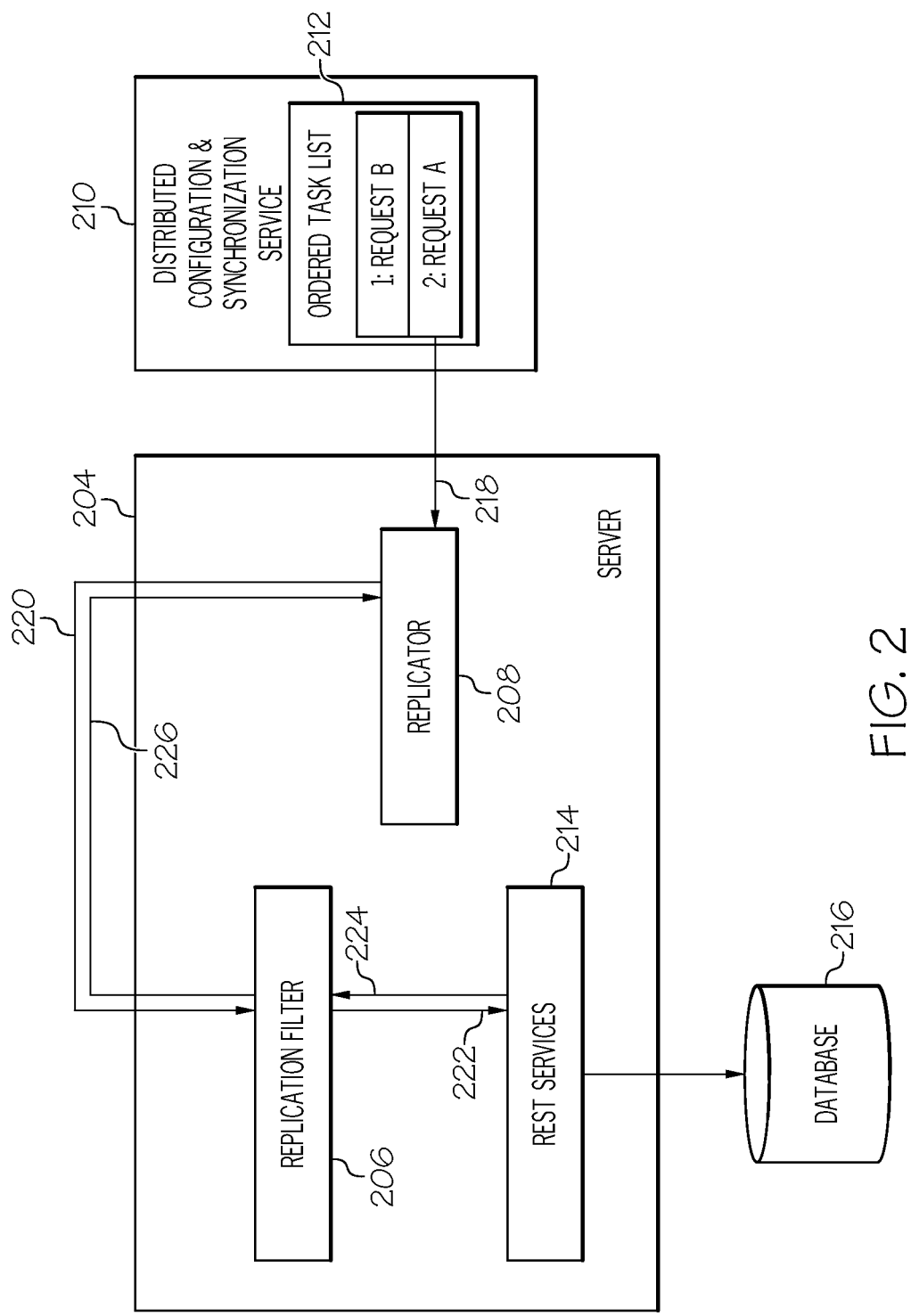
FIG. 2 illustrates handling of a replicated request on a server that is not the requesting user's local server, but is running another instance of the service that the requesting user's local server is also running, in one embodiment of the present disclosure.

FIG. 2 illustrates handling of a replicated request on a server that is not the requesting user's local server, but is running another instance of the service that is also running on the requesting user's local server, in one embodiment of the present disclosure. A request originating from a different server has been put in a task list 212 of a local synchronization service node instance 210 for this server 204, and is picked up by a replicator 208 as shown by an arrow at 218. The replicator 208 makes a request to its own server 204 as shown by an arrow at 220. A special parameter on the request instructs a replication filter 206 to let it pass through. The request gets to a REST service 214 to perform the appropriate action (e.g., create or modify an object) as shown by an arrow at 222. The changed configuration, e.g., created or modified object may be stored in a database 216. The result of the REST call is returned from the REST service 214 up through the replication filter 206 as shown by an arrow at 224. The response is received by the local replicator 208 as shown by an arrow at 226. In one embodiment, the response is discarded because the request was not initiated by a local user.

Figure 3:
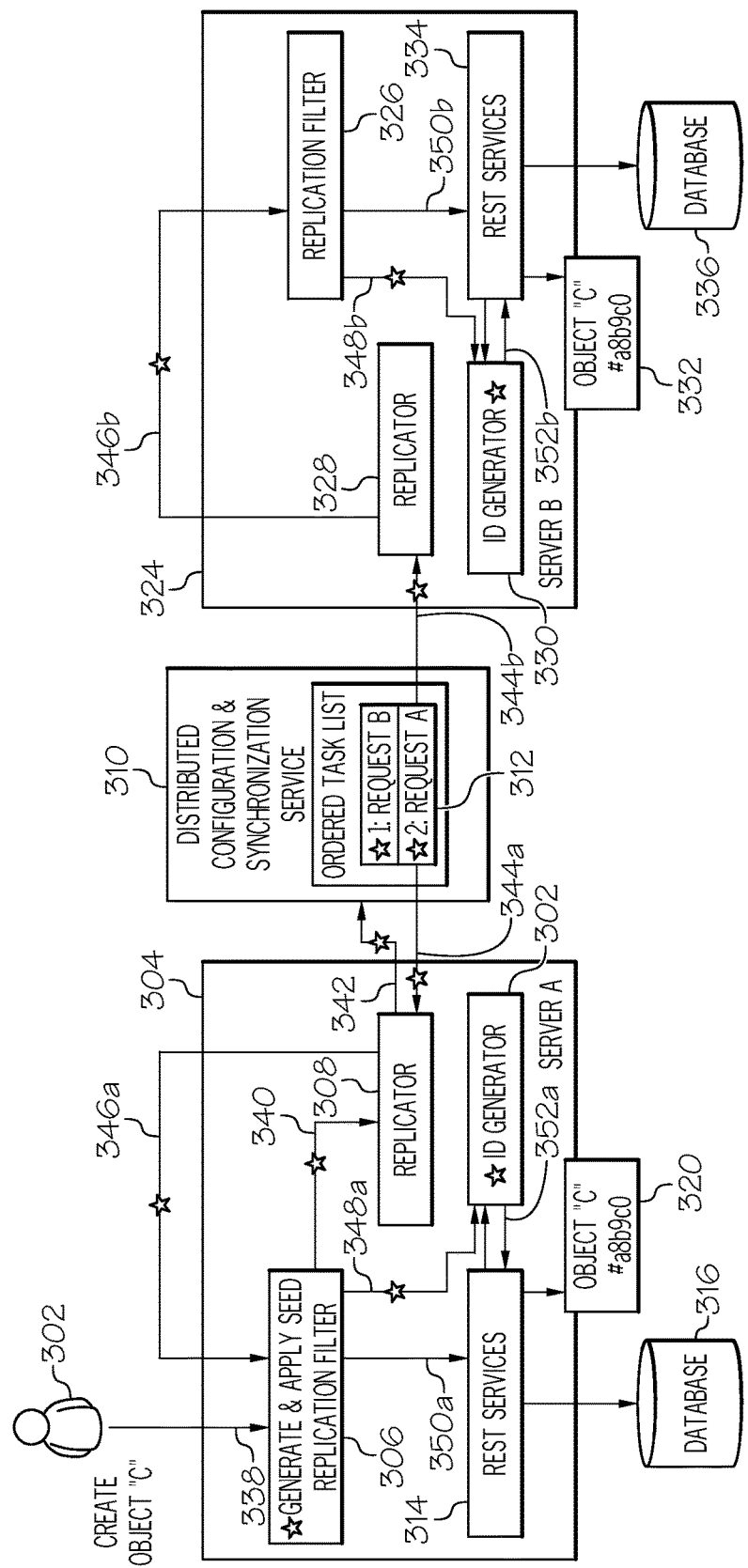
FIG. 3 illustrates handling of an ID generation seed in one embodiment of the present disclosure.

FIG. 3 illustrates handling of an ID generation seed in one embodiment of the present disclosure. A user 302 submits request to a local server 304 as shown by an arrow at 338. The request, for example, creates an object "C". A filter 306 intercepts the request, determines that it is not idempotent, and sends request data to the replicator 308 as shown by an arrow at 340, and blocks until it receives a response. The filter 306 also generates a new seed for ID generation and includes it with the request to the replicator. The replicator 308 submits the request to a distribution synchronization system or node 310 as shown by an arrow at 342, which adds the work to the ordered list 312 for all server instances.

Each server (e.g., 324) receives the request from its local distribution synchronization system or node instance, including the seed, for example, shown by arrows at 344a and 344b. Each replicator (e.g., 308, 328) makes a request to its own server (e.g., 304, 324) as shown by arrows at 346a and 346b, the request including a special request header with the ID generation seed. In one embodiment, every request made from the replicator to its own server may include several headers: The secret key, a flag to mark that it is a replicated request, the identity of the user who initiated the request, and the ID generation seed. Those different headers function together to provide the internal processing information to the replication filter.

Each replication filter (e.g., 306, 326) applies the seed to a thread-local ID generation object (318, 330) as shown by arrows at 348a and 348b, which persists for the duration of the request. In one embodiment, a single instance of the ID generator object is created for each request, and all functions which need to acquire a new ID for a new object retrieves the instance of the ID generator for the current request to get the ID. A replication filter may create this ID generator instance and set the seed value on it to control which IDs it generates. In one aspect, a "thread local" utility provided by JAVA may be used to keep track of which seed generator to use for each thread which is processing a request. For instance, each request may be handled by a single thread in a server; there may be other threads which could be handling other requests concurrently using different ID generator instances. A thread-local ID generation object (318, 330) may be a module or functionality that is instantiated during the processing of a request, and which generates unique IDs based on an input seed value.

The request is sent to the appropriate REST service (e.g., 314, 334) to perform the desired action as shown by arrows at 350a and 350b. As objects are created, all generated IDs are obtained from the ID generator instance (e.g., 318, 330) as shown by arrows at 352a and 352b. Because both servers 304, 324 use the same seed and perform the same actions in the same order, both servers 304, 324 produce objects with identical IDs 320, 332. The changed configuration, e.g., created or modified object may be stored in a database 316, 336.

In one aspect, the techniques of the present disclosure support multiple master server scenarios. In addition, the replication methodology may be implemented as an ongoing backend task which listens for changes on one or more of the master servers and applies them to the slave servers.

A filter described above may be implemented as a servlet filter. There may be other implementations of filters which are unrelated to JAVA servlet technology, for example, in other programming languages without the concept of servlets. A servlet filter, e.g., captures all information about incoming configuration-related HTTP requests, holds the request open while coordinating that the request will be applied to all of the other servers, and then returns to the user indicating operating success or failure. Details about the request are sent to the other servers (e.g., remote servers) in a cluster (to a collection of servers on which the replication filter has been applied), using a distribution synchronization system. The cluster, for example, may include a group of servers that provide the same service and are interconnected with one another. The same request is executed against the other servers with a special token attached which causes the request to bypass the replication procedure of the filter on the other servers.

In one embodiment, the techniques of the present disclosure may accomplish replication by capturing and re-applying all HTTP requests to perform configuration change, for example, at the top layer of an application, rather than using the persistence framework or storage system at the bottom layer. For instance, the replication filter of the present disclosure can be applied on top of any other service which uses requests like HTTP requests to modify configuration, regardless of the underlying storage system and existing persistence layer architecture. Rather than replicating the fully created configuration as stored in the data layer to other servers, a technique in the present disclosure in one embodiment replicates the requests to create configuration. Each server may take that request and create additional accompanying configuration. In one embodiment, a technique of the present disclosure utilizes a consistent random ID generator with a seed attached to every replicated request to modify configuration on the target servers independently while still ensuring that they all have the same resulting configuration.

As described above, configuration updates may be replicated by intercepting configuration HTTP requests and sending the configuration HTTP request in an agreed to ordering to other servers. For example, a Hypertext Transfer Protocol (HTTP) request may be intercepted from a client device to a server. The request is examined to determine if the request may cause a configuration change. Responsive to determining the request may cause the configuration change, a unique identifier for the request may be created, and the request annotated with the unique identifier may be sent synchronously to other servers in a cluster. The server may receive an agreed to ordering from the other servers in which the change will be applied to the other servers relative to any other concurrent requests. The server may process the request in the agreed to ordering, for example, while assuming that all other servers will reach the same result on applying the same change. The server may return the status of the operation to the client device. The interception may be based on an application programming interface (API), for example, a Representational state transfer (REST). In another aspect, the interception may be based on monitoring packets. In one aspect, the configuration change may be signaled or indicated by one or more of PUT, POST, and DELETE methods in the request. The unique identifier may comprise one or more of a counter and a cryptographic key. The updates may be ordered to ensure consistency across a cluster. In one aspect, the servers independently update their configurations based on the received request.

Figure 4:
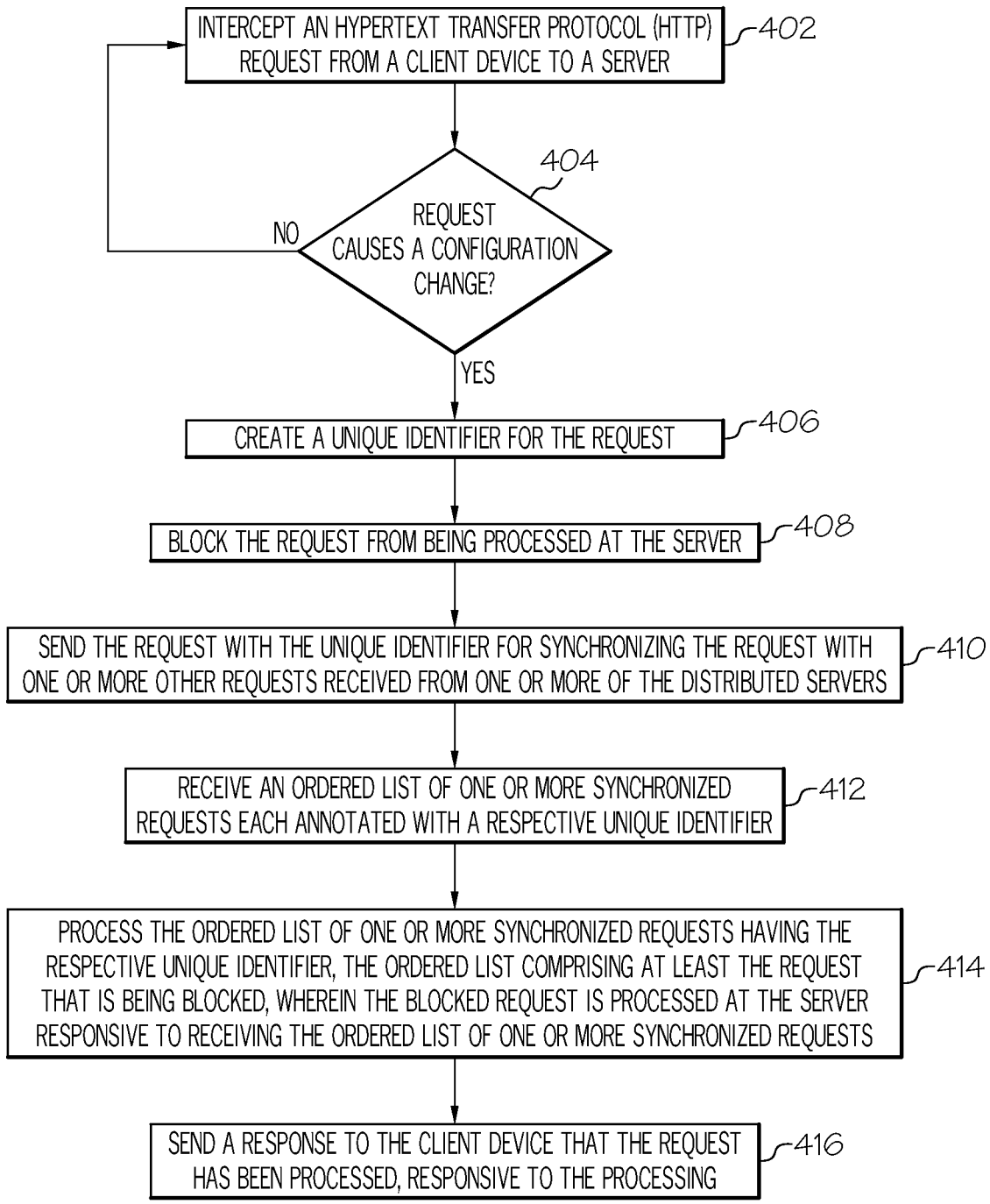
FIG. 4 is a flow diagram illustrating a replicating a configuration update among distributed servers in one embodiment of the present disclosure.

FIG. 4 is a flow diagram illustrating a replicating a configuration update among distributed servers, for example, described above, in one embodiment of the present disclosure. At 402, an HTTP request from a client device to a server is intercepted. The server is one of the distributed servers in a cluster running a service or application in distributed computing environment. At 404, it is determined whether the request causes a configuration change in the server. If the request is determined to not cause a configuration change in the server, the request may be processed in a usual manner, and the logic may proceed to monitoring for requests for interception at 402.

If it is determined that the request causes a configuration change, the logic of the flow proceeds to 406. For example, the presence of one or more of put, post and delete operations in the HTTP request signals the configuration change. At 406, a unique identifier for the request is created. The unique identifier may be a seed generated, e.g., by a random number generator. At 408, the request is blocked. For instance, the processing of the request in the server is blocked, for example, until the request is received again as a synchronized request.

At 410, the request with the unique identifier is sent for synchronizing the request with one or more other requests received, or originating from, one or more of the distributed servers.

At 412, an ordered list of one or more synchronized requests each annotated with a respective unique identifier is received, for example, from a distribution synchronization module that synchronizes the requests originating from one or more of the distributed servers.

At 414, the ordered list of one or more synchronized requests having the respective unique identifier. In one embodiment, the ordered list includes at least the request that is being blocked (i.e., the request received from the client device by this server). The blocked request may then be processed at the server responsive to receiving the ordered list of one or more synchronized requests.

At 416, a response is sent to the client device that the request has been processed, responsive to the processing.

As described above, the ordered list of one or more synchronized requests is sent to all of the distributed servers asynchronously, so that those servers can independently process the requests. The servers may process the requests at different times (although they may be processed at times that are generally close to one another). Unlike synchronous handling, no server need to wait for any other server to process any requests. The unique identifier associated with the request may be used by the servers individually to generate an object identifier associated with an object of the configuration change. In this way, all of the distributed servers generate the same object identifier in processing the same request in the ordered list of one or more synchronized requests. The object identifier may be implemented as one or more of a counter, a cryptographic key, or another identifier.

In one aspect, the requests handled by the techniques of the present disclosure include application-level requests, e.g., intercepted by an application on top of which a filter of the present disclosure may operate. In another aspect, the techniques of the present disclosure may use knowledge of HTTP and application semantics to distinguish, from the point of view of replication, interesting and uninteresting requests and only replicates interesting requests, for example, those request that are not idempotent. Yet in another aspect, a total order may be imposed on all replicated requests and require the order for successful replication. Still yet in another aspect, each replica may be envisioned as a complete copy of the replicated data. For example, replication does not require mediation of a master server, as new requests can originate from any replica, each replica is responsible for distributing its own requests to other replicas, and all replicas participate in sequencing requests through consensus.

FIG. 5 illustrates a schematic of an example computer or processing system that may implement a replication system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules (e.g., the components the server) 10 that perform the methods described herein. The modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of replicating a configuration update among distributed servers, comprising:
   intercepting a request from a client device to a server;
   creating a unique identifier for the request;
   blocking the request from being processed at the server;
   sending the request with the unique identifier for synchronizing the request with one or more other requests received from one or more of the distributed servers;
   receiving an ordered list of one or more synchronized requests each annotated with a respective unique identifier;
   processing the ordered list of one or more synchronized requests having the respective unique identifier, the ordered list comprising at least the request that is being blocked, wherein the blocked request is processed at the server responsive to receiving the ordered list of one or more synchronized requests.

2. The method of claim 1, further comprising determining whether the request causes a configuration change in the server, wherein the creating, blocking, sending, receiving and processing are performed responsive to determining that the request causes the configuration change.

3. The method of claim 2, wherein the request comprises a Hypertext Transfer Protocol (HTTP) and a presence of one or more of put, post and delete operations in the HTTP request signals the configuration change.

4. The method of claim 1, further comprising sending a response to the client device that the request has been processed, responsive to the processing.

5. The method of claim 1, wherein the ordered list of one or more synchronized requests is sent to all of the distributed servers asynchronously.

6. The method of claim 1, wherein the unique identifier comprises a seed for generating an object identifier associated with an object of the configuration change, wherein all of the distributed servers generate same object identifiers for one or more objects created as a result of processing the request in the ordered list of one or more synchronized requests.

7. The method of claim 6, wherein the object identifier comprises one or more of a counter and a cryptographic key.

8. A system for replicating a configuration update among distributed servers, comprising:
a server executing on at least one hardware processor;
a filter running on the server, the server being one of the distributed servers, the filter operable to intercept a request from a client device to the server, the filter further operable to create a unique identifier for the request, the filter operable to block the request from being processed at the server; and
a replicator running on the server, the replicator operable to send the request with the unique identifier for synchronizing the request with one or more other requests received from one or more of the distributed servers, the replicator further operable to receive an ordered list of one or more synchronized requests each annotated with a respective unique identifier,
the server operable to process the ordered list of one or more synchronized requests having the respective unique identifier, the ordered list comprising at least the request that is being blocked, wherein the blocked request is processed at the server responsive to receiving the ordered list of one or more synchronized requests.

9. The system of claim 8, wherein the filter determines whether the request causes a configuration change in the server, wherein the filter blocks the request and the replicator sends the request for synchronizing based on determining that the request causes the configuration change.

10. The system of claim 9, wherein the request comprises a hypertext transfer protocol (HTTP) request and a presence of one or more of put, post and delete operations in the HTTP request signals the configuration change.

11. The system of claim 8, wherein the server is further operable to send a response to the client device that the request has been processed, responsive to processing the ordered list of synchronized requests.

12. The system of claim 8, wherein the ordered list of one or more synchronized requests is sent to all of the distributed servers asynchronously.

13. The system of claim 8, wherein the unique identifier comprises a seed for generating an object identifier associated with an object of the configuration change, wherein all of the distributed servers generate same object identifiers for one or more objects created as a result of processing the request in the ordered list of one or more synchronized requests.

14. The system of claim 13, wherein the object identifier comprises one or more of a counter and a cryptographic key.

15. A computer readable storage medium storing a program of instructions executable by a machine to perform a method of replicating a configuration update among distributed servers, the method comprising:
intercepting a request from a client device to a server;
creating a unique identifier for the request;
blocking the request from being processed at the server;
sending the request with the unique identifier for synchronizing the request with one or more other requests received from one or more of the distributed servers;
receiving an ordered list of one or more synchronized requests each annotated with a respective unique identifier;
processing the ordered list of one or more synchronized requests having the respective unique identifier, the ordered list comprising at least the request that is being blocked, wherein the blocked request is processed at the server responsive to receiving the ordered list of one or more synchronized requests.

16. The computer readable storage medium of claim 15, further comprising determining whether the request causes a configuration change in the server, wherein the creating, blocking, sending, receiving and processing are performed responsive to determining that the request causes the configuration change.

17. The computer readable storage medium of claim 16, wherein the request comprises a Hypertext Transfer Protocol (HTTP) and a presence of one or more of put, post and delete operations in the HTTP request signals the configuration change.

18. The computer readable storage medium of claim 15, further comprising sending a response to the client device that the request has been processed, responsive to the processing.

19. The computer readable storage medium of claim 15, wherein the ordered list of one or more synchronized requests is sent to all of the distributed servers asynchronously.

20. The computer readable storage medium of claim 15, wherein the unique identifier comprises a seed for generating an object identifier associated with an object of the configuration change, wherein all of the distributed servers generate same object identifiers for one or more objects created as a result of processing the request in the ordered list of one or more synchronized requests, wherein the object identifier comprises one or more of a counter and a cryptographic key.

* * * * *